United States Patent [19]

Canniff et al.

[11] 4,048,448
[45] Sept. 13, 1977

[54] MULTIPARTY TELEPHONE RINGING

[75] Inventors: Ronald Jay Canniff, Mount Arlington; Mark Thomas Manfred, Rockaway, both of N.J.

[73] Assignee: Bell Telephone Laboratories, Incorporated, Murray Hill, N.J.

[21] Appl. No.: 659,369

[22] Filed: Feb. 19, 1976

[51] Int. Cl.$^2$ ............................................. H04M 3/02
[52] U.S. Cl. .............................. 179/17 E; 179/84 SS; 179/2.5 R
[58] Field of Search ............... 179/17 E, 84 R, 84 SS, 179/15 AL, 15 BA, 15 BY, 2.5

[56] References Cited

U.S. PATENT DOCUMENTS

| | | | |
|---|---|---|---|
| 3,118,019 | 1/1964 | Feder et al. | 179/84 SS |
| 3,211,839 | 10/1965 | Adelaar et al. | 179/84 |
| 3,223,787 | 12/1965 | Jorgensen | 179/84 |
| 3,391,253 | 7/1968 | Grandmaison | 179/84 SS |
| 3,649,778 | 3/1972 | Suntop et al. | 179/17 E |
| 3,689,705 | 9/1972 | Pinede et al. | 179/17 E |
| 3,898,387 | 8/1975 | Fort | 179/15 BY |
| 3,899,754 | 8/1975 | Brolin | 332/11 |

*Primary Examiner*—Kathleen H. Claffy
*Assistant Examiner*—Gerald L. Brigance
*Attorney, Agent, or Firm*—Robert O. Nimtz

[57] ABSTRACT

A subscriber loop carrier system using digital multiplex techniques is disclosed in which remote subscriber loops include multiparty lines. Four party fully selective ringing signals are detected at the central office terminal of the system and converted to cyclic codes which are detected at the remote terminal with simple asynchronous circuits. The code generation and detection circuits are implemented with multiple output inverter circuits which provide simple logic structures for integrated circuit realization. Standard polarized ringing signals are applied to either conductor at the remote terminal of the system to ring the proper party.

13 Claims, 8 Drawing Figures

CENTRAL OFFICE CHANNEL UNIT

REMOTE CHANNEL UNIT

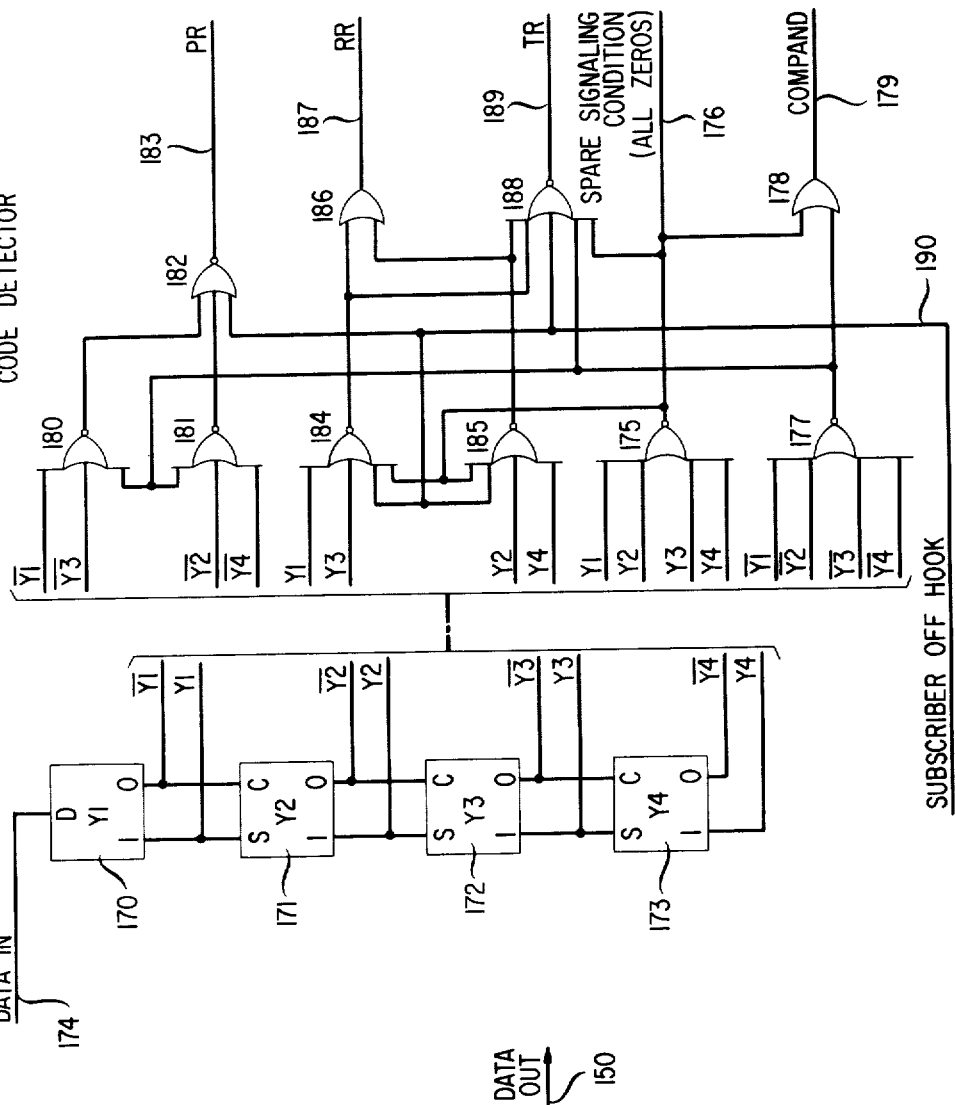
FIG. 5 CODE DETECTOR
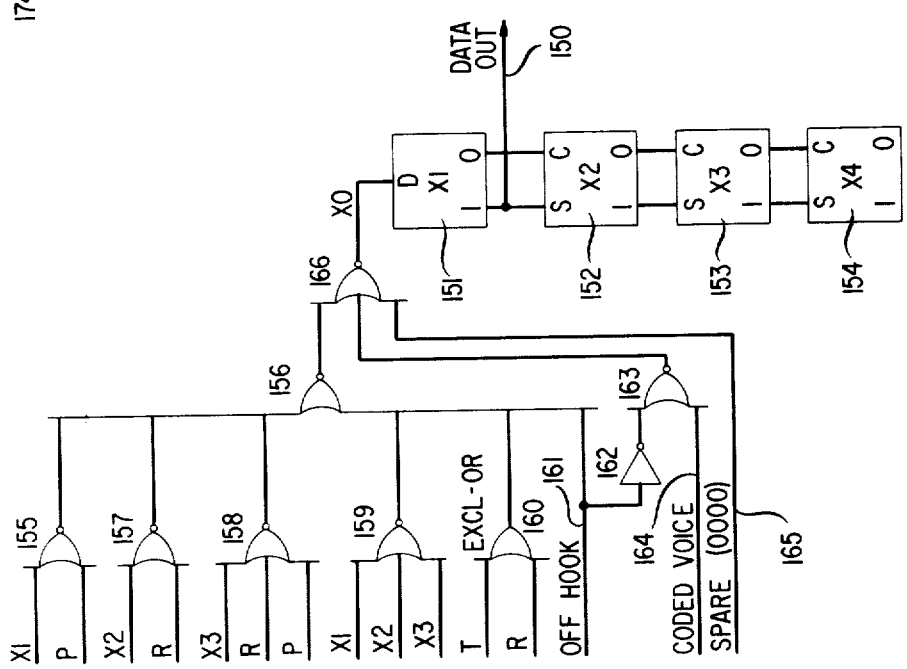
FIG. 4 CODE GENERATOR

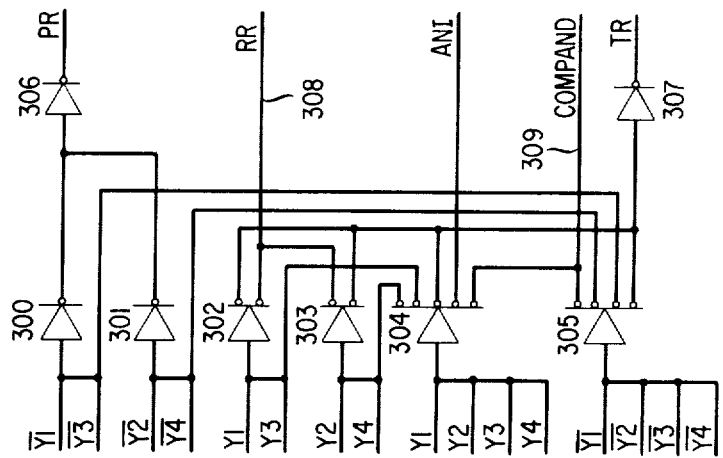
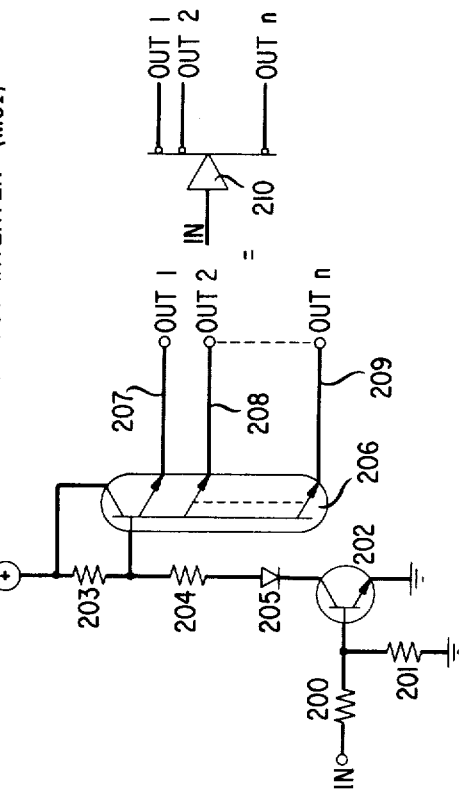
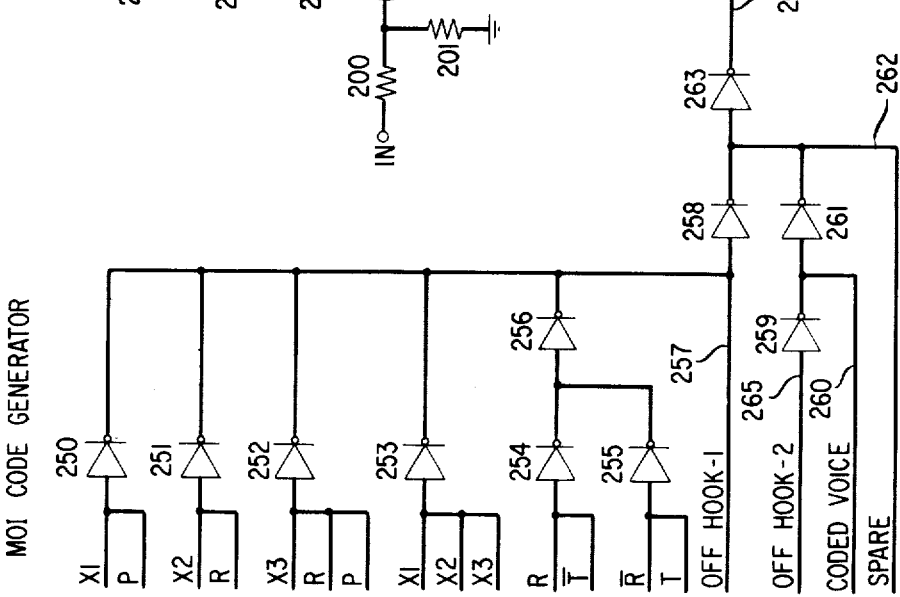

MULTIPARTY TELEPHONE RINGING

BACKGROUND OF THE INVENTION

1. Field of the Invention

This invention relates to subscriber loop carrier systems and, more particularly, to selective party ringing in digital subscriber loop transmission systems.

2. Description of the Prior Art

In order to provide fully selective ringing signals on multiparty telephone lines, it has been customary to superimpose a direct current voltage on the ringing signal and to vary the polarity and the conductor-to-ground connection to distinguish among the various parties. Thus positive or negative superimposed battery selectively connected between the tip or ring conductors and ground provides four party fully selective ringing. The ringing circuit in each telephone set must, of course, be equipped to respond only to a ringing signal with the proper polarity of superimposed battery and applied between the appropriate conductor and ground. One such ringing signal detector is disclosed in the copending application of C. E. Jones and W. F. MacPherson, Ser. No. 648,165, filed Jan. 12, 1976 and assigned to applicant's assignee.

It has become increasingly desirable to connect local telephone loops to a central office location over carrier systems of one type or another in order either to maximize the use of conductor pairs in congested areas, to avoid laying new cable, or to extend the range of conductor pairs in sparsely populated rural areas. Modern digital technology has permitted the use of digital multiplexing techniques in such carrier systems. Such digital transmission systems also have the advantages of good immunity from noise and the capability of implementation with standard digital circuitry. One such digital subscriber loop carrier system is disclosed in the J. L. Caldwell U.S. Pat. No. 3,924,080, granted Dec. 2, 1975, and assigned to applicant's assignee.

In order to serve multiparty lines over digital transmission systems, it is necessary to transmit the selective ringing signals to the remote end of the transmission system in such a manner that they can be detected and utilized to ring the appropriate party. Moreover, these ringing signals must replicate the standard ringing and silent interval cycle at the subscriber location. Finally, such multiparty ringing must be accomplished with small and inexpensive circuitry to insure the economic viability of the digital transmission system.

SUMMARY OF THE INVENTION

In accordance with the illustrated embodiment of the present invention, multiparty fully selective ringing signals are transmitted through a digital transmission system using cyclic codes having the property of presenting unique coding groups, irrespective of the time of detection of the group. In this way, selective ringing signals can be detected asynchronously and continuously throughout the ringing interval of the ringing cycle. Such cyclic codes can be generated and detected with simple digital logic circuits suitable for integration on integrated circuit chips. More particularly, multiple output inverter circuits can be used to implement both the generator and detector of such cyclic codes.

One major advantage of the selective ringing technique of the present invention is the fact that the digital transmission system can thereby be made entirely transparent to both the central office and to the party line subscribers. This transparency simplifies the interaction of such a system with the existing telephone plant. Obvious advantages of size and economy also arise from the digital logic implementation which can be based on integrated circuit technology.

A further advantage is the capability to do multiparty signaling over the same digital channel that provides voice coding and companding information, and which is a direct extension of what is done for single party signaling.

BRIEF DESCRIPTION OF THE DRAWING

FIG. 4 is a detailed logic diagram of a multiparty ringing code generator useful in the channel unit of FIG. 2;

FIG. 5 is a detailed logic diagram of a selective ringing code detector suitable for use in the remote channel unit of FIG. 3;

FIG. 6 is a detailed circuit diagram of a multiple emitter inverter circuit suitable for use as the basic logic component of multiple output inverter logic circuits which find use in one implementation of the present invention;

FIG. 7 is a detailed circuit diagram of a multiple output inverter logic circuit which implements the code generator of FIG. 4; and FIG. 8 is a detailed circuit diagram of a multiple output inverter logic circuit implementing the code detector shown in FIG. 5.

DETAILED DESCRIPTION

Figure 1:
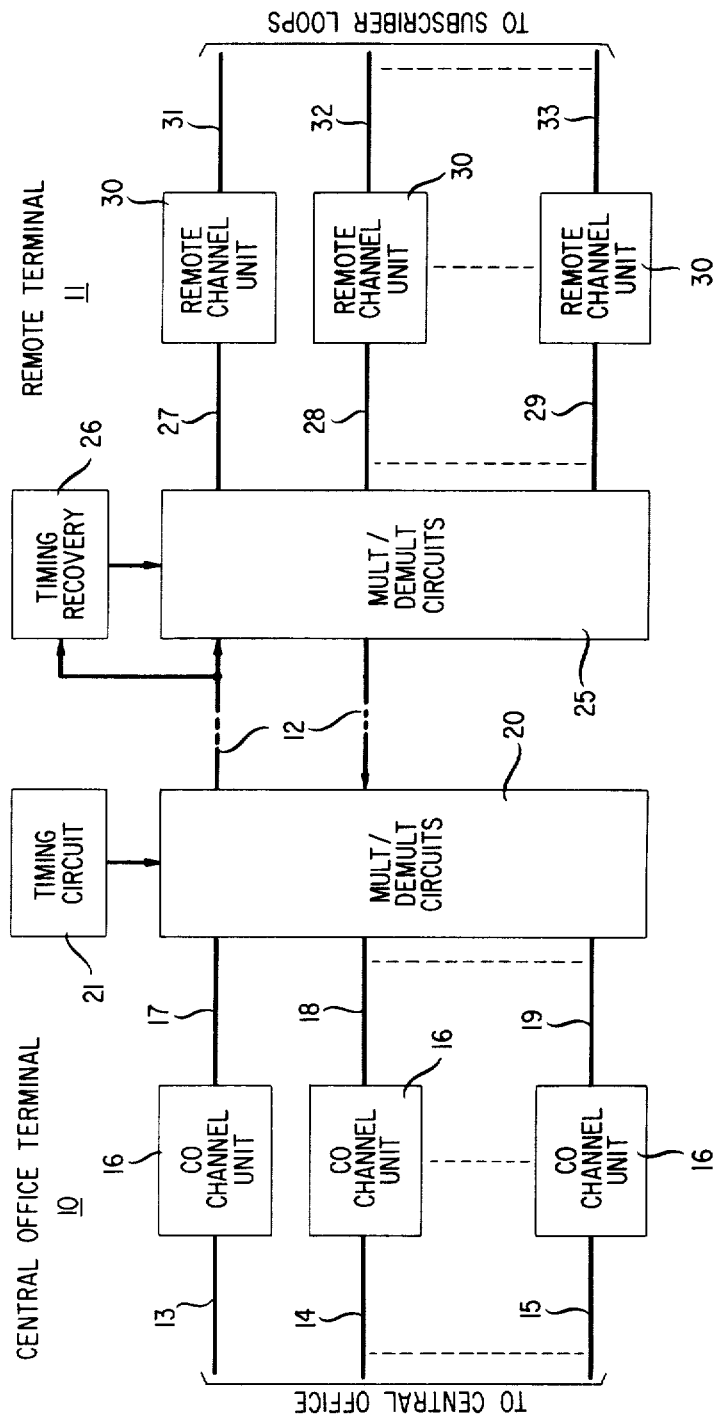
FIG. 1 is a general block diagram of a digital subscriber loop transmission system of a type in which the selective ringing arrangements of the present invention might find use.

In FIG. 1 there is shown a general block diagram of a subscriber loop carrier system in which the party line selective ringing arrangements of the present invention will find use. The carrier system of FIG. 1 comprises a central office terminal 10 and a remote terminal 11 interconnected by a transmission facility 12, which in the preferred embodiment comprises two pairs of standard telephone subscriber loop conductors.

The central terminal 10 includes a plurality of subscriber lines 13, 14, . . . 15, which represent the subscriber appearances of those lines at the telephone central office. Central office channel units 16 are interposed in each of subscriber lines 13 through 15 to translate analog signals on the subscriber appearances 13 through 15 into two-way digital signals on respective lines 17, 18, . . . 19. The digital pulse streams from central office channel units 16 are multiplexed and demultiplexed in circuits 20 under control of clock signals from timing circuit 21. Outgoing line 12 therefore contains a multiplexed digital stream carrying digitally coded information concerning the signals on each of subscriber appearances 13 through 15. Similarly, incoming line 12 carries a digital pulse stream of digitally coded signals from remote terminal 11 and intended for the individual one of subscriber appearances 13 through 15.

At remote terminal 11 a multiplexing and demultiplexing circuit 25 receives and transmits, respectively, these pulse streams under the control of clock signals from a timing recovery circuit 26. By the use of standard framing techniques, the various channels are separated in circuit 25 and delivered to appropriate ones of lines 27, 28 . . . 29, and thence to remote channel units 30. Channel units 30 are each identical and interface between digital signals on lines 27 through 29 and analog signals on corresponding subscriber appearances 31, 32, . . . 33. These analog signals are delivered to and received from standard telephone subscriber stations connected to lines 31 through 33.

The carrier system of FIG. 1 is a standard digital multiplex arrangement and can be used over a wide variety of transmission facilities including, not only conductor pairs, but also coaxial cable, microwave links, and satellite circuits. One such multiplex system is shown in the J. L. Caldwell U.S. Pat. No. 3,924,080, granted Dec. 2, 1975.

Figure 2:
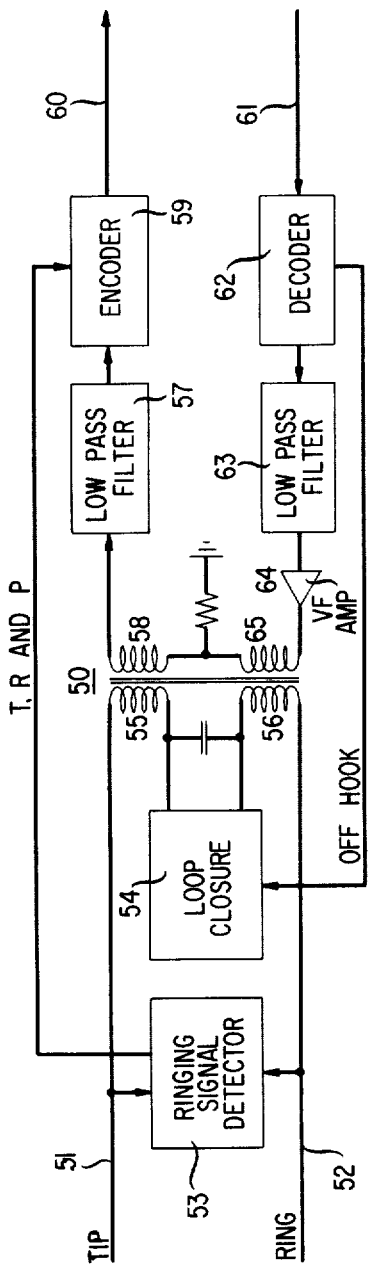
FIG. 2 is a more detailed block diagram of a central office channel unit including the analog-digital interface necessary for use in the transmission system of FIG. 1.

In FIG. 2 there is shown a more detailed block diagram of a central office channel unit suitable for use in the subscriber loop carrier system of FIG. 1. The channel unit of FIG. 2 comprises a hybrid transformer 50, one side of which is connected to subscriber tip and ring conductors 51 and 52, respectively, from the telephone central office. A ringing signal detector 53 is connected across conductors 51 and 52 to detect superimposed ringing signals from the central office for any one of a plurality of subscribers at the remote location. In accordance with standard telephone technology, a 20 Hz ringing signal is imposed on either a positive or a negative battery and this composite signal is applied selectively between the tip or ring conductor and ground potential. This ringing arrangement provides four-party fully selective ringing or eight-party semiselective ringing. A loop closure circuit 54 is connected between windings 55 and 56 of hybrid transformer 50 to repeat the loop closures which take place at the remote subscriber location. A low-pass filter 57 is connected to the transmitting leg 58 of hybrid transformer 50 to limit the bandwidth to the voice frequency range of audio signals applied to a digital encoder circuit 59. When the subscriber is off hook, encoder 59 converts the analog signal from low pass filter 57 to a digital format, and transmits it on digital line 60. Alternately, when the subscriber is on hook, encoder 59 selectively transmits one of five unique digital signaling codes in response to ringing signal detector 53.

A digital pulse stream arriving on incoming digital line 61 is decoded in decoder circuit 62 and the resulting analog voice signals applied to low-pass filter 63. The filtered output from circuit 63 is applied to voice frequency amplifier 64 and then to the receiving leg 65 of hybrid transformer 50. The analog voice signals are thus supplied to tip and ring conductors 51 and 52 and thence to the central office circuits for connection to another subscriber.

Decoder 62 also decodes supervisory signals intermixed with the voice signals on digital line 61 and delivers the supervisory signals to a loop closure circuit 54 where the loop closures at the remote location are repeated at the central office location.

Figure 3:
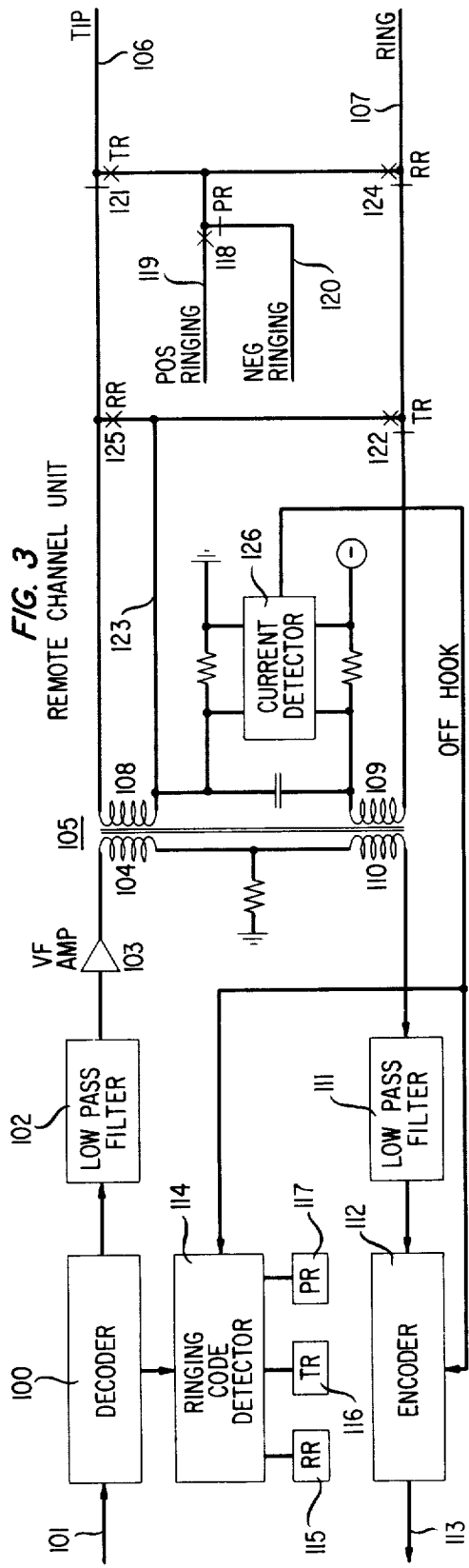
FIG. 3 is a more detailed block diagram of a channel unit suitable for use at the remote terminal of a digital transmission system such as that shown in FIG. 1.

In FIG. 3 there is shown a more detailed block diagram of a remote channel unit useful in the subscriber loop carrier system of FIG. 1. The remote channel unit of FIG. 3 comprises a decoder circuit 100 which receives a digital pulse stream on digital line 101 and decodes this digital information. Voice frequency signals are filtered by circuit 102, amplified in voice frequency amplifier 103, and delivered to the receiving leg 104 of a hybrid transformer 105.

Voice frequency signals from the subscriber set on tip conductor 106 and ring conductor 107 are supplied to windings 108 and 109 of hybrid transformer 105 and thence through transmitting leg 110 to low-pass filter 111. The output from filter 111 is supplied to an encoder circuit 112 which translates the analog signals into a digital pulse train for transmission on digital line 113. In this way, voice signals can be transmitted from the remote subscriber location to the central office location with part of a multiplexed digital pulse stream.

In addition to decoding voice signals, decoder 100 also receives selective ringing codes from transmission facility 101 and supplies these signals to party code detector 114. That is, when the current detector 106 recognizes that the subscriber is on hook, coded ringing codes selectively operate ringing relays 115, 116, and 117, indicating that ringing signals must be applied to the ring conductors (RR relay 115) or to the tip conductor (TR relay 116), and the proper polarity of the superimposed battery (PR relay 117). Contacts on these relays connect subscriber conductors 106 and 107 to appropriate signal sources as can be seen by examination of FIG. 3. In particular, polarity relay 117 operates contacts 118 to enable the appropriate one of a positive ringing source 119 or a negative ringing source 120. Tip ringing relay 116 operates contacts 121 and 122 to connect the ringing signal between the tip conductor 106 and ground potential on lead 123. Similarly, contacts 124 and 125 of RR relay 115 connect the ringing signal between ring conductor 107 and ground conductor 123. In this way, the same ringing signal which appears at the central office appearances 51 and 52 (FIG. 2) are supplied to the remote subscriber on leads 106 and 107.

In order to detect loop closures at the remote subscriber location, a current detector 126 is provided which senses the current flowing in the remote subscriber loop 106 and 107, encodes this indication in encoder 112 and transmits the information back to the central office by way of digital line 113. This loop closure information is necessary to detect off-hook conditions as well as the dial pulses generated at the subscriber set.

The encoders and decoders in the two channel units of FIG. 2 and 3 preferably have the form shown in S. J. Brolin U.S. Pat. No. 3,899,754, granted Aug. 12, 1975. As can be seen in FIG. 4 and 5 of that patent, both the encoder and decoder include a four-stage shift register to store the most recently transmitted or received four bits of the pulse train arriving on or delivered to their respective digital lines. At the encoder, these bits can be conveniently identified as X1, X2, X3, and X4. At the receiver the corresponding bits are identified by Y1, Y2, Y3, and Y4. The party line selective ringing arrangements of the present invention are readily implemented with coders and decoders of the form shown in the Brolin patent. More particularly, and as shown in the detailed circuit diagrams of FIG. 4 and 5 the transmitted data signal can indicate to the remote Channel Unit which type of ringing, if any, the central office is applying to the CO channel unit. This is accomplished by transmitting a unique code for each of the four different ringing signals, plus a fifth unique code to indicate when the central office is not applying ringing. The preferred code assignments are shown in Table I.

TABLE I

| Signalling Condition | Cyclic Codes |
|---|---|
| (Spare) | 0000 |
| Positive on Ring | 0001, 0010, 0100, 1000 |
| Negative on Ring | 1010, 0101 |
| Positive on Tip | 1100, 0110, 0011, 1001 |
| Negative on Tip | 1110, 0111, 1011, 1101 |
| NO RINGING | 1111 |

It will be noted that each condition of Table I is assigned one of the six unique four-bit cyclic codes. Each cyclic code consists of 1, 2, or 4 code words. The use of cyclic codes permits continuous detection of a signaling condition by examination of any four consecutive bits in the received serial bit stream. These codes have the advantages of being capable of generation with simple logic circuits, of being detected asynchronously, and finally, of providing the continuous detected output as long as the particular code is being received. These attributes are particularly useful for selective ringing in multiparty telephone circuits where it is essential to minimize the amount of detection equipment located at the remote location. The use of simple logic circuits, moreover, permits integration of these remote circuits, thus reducing their size and cost.

In FIG. 4 there is shown a detailed logic diagram of a code generator which generates the codes to be transmitted on digital output line 150 in response to the outputs from ringing signal detector 53 (FIG. 2). The code generator in FIG. 4 includes a shift register having four stages 151, 152, 153, and 154. These stages have been identified as X1, X2, X3, and X4, and each has a double-railed output. The 1 output of X1 stage 151 is combined with a polarity indicating signal (P) in NOR gate 155 to supply one input to NOR gate 156. The 1 output of X2 stage 152 is combined with a signal indicating a ringing signal on the ring conductor (R) in NOR gate 157. The 1 output of X3 stage 153 is combined in NOR gate 158 with both a polarity indicating signal (P) and a ring conductor indicating signal (R) to supply yet another input to NOR gate 156. The 1 outputs of X1, X2, and X3 stages 151, 152, and 153, respectively, are combined in NOR gate 159 to supply another input to NOR gate 156. A signal indicating the presence of a ringing signal on the tip conductor (T) is combined with a similar signal with respect to the ring conductor (R) in exclusive NOR gate 160. The output of exclusive NOR gate 160 indicates the presence of a ringing signal on neither of or both of tip and ring conductors and thus inhibits transmission of any ringing code under these conditions. The output of exclusive NOR gate 160 is also supplied to NOR 156.

A signal on lead 161 indicates an off-hook (loop closure) signal at the central office terminal. This signal is combined with the other inputs to NOR gate 156 and is also inverted by inverter 162 and applied to NOR gate 163. Coded voice signals from a voice encoder, not shown, and appearing on line 164 are combined in NOR gate 163 with inverted off-hook signals and supplied as one input to NOR gate 165. Finally, lead 166 is also supplied to NOR gate 165 to enable the spare signaling condition (all 0's). The output of NOR gate 156 provides the last input to NOR gate 165. The output of NOR gate 165 is supplied to X1 stage 151, the output of which is transmitted to the distant terminal. The signals are successively passed through X2 stage 152, X3 stage 153, and X4 state 154 to provide appropriate inputs to NOR gates 155, 157, 158, and 159. As taught in the above-named Brolin Pat. No. 3,899,754, the contents of register 151 through 154 can also be used to control companding in the transmitted digital pulse train.

The logic circuit of FIG. 4 takes advantage of particular respective patterns in the codes of Table I to permit generation of these codes with a minimum of logic circuitry. In combination, they insure transmission of the appropriate codes for each of the stated conditions in Table I.

In FIG. 5 there is shown a detailed logic diagram of a code detector circuit suitable for receiving and decoding the party codes generated by FIG. 4. The decoder at the remote terminal includes a shift register having stags 170, 171, 172, and 173, which have been labeled Y1, Y2, Y3, and Y4, respectively. Received data appearing on digital line 174 is applied to Y1 stage 170, and thereafter propagated through stages 171, 172, and 173. The double railed outputs of these stages provided inputs to the balance of the code detector circuit in FIG. 5.

The decoder shown in the aforementioned Brolin patent contains logic circuits (gates 175 and 177) that indicate when Y1, Y2, Y3, and Y4 are either all 1 or all 0.

In particular, the 1 outputs of Y1 stage 170, Y2 stages 171, Y3 stage 172, and Y4 stage 173 are combined in NOR gate 175 to provide on output lead 176 an indication that an all 0's signal has been received. As noted in Table I, this is a spare signaling condition which, for instance, can be used for automatic number identification (ANI), a technique used to identify the appropriate one of two parties on a two-party line.

The 0 outputs of Y1 stage 170, Y2 stage 171, Y3 stage 172, and Y4 stage 173 are combined in NOR gate 177 to indicate the reception of an all 1's code. The outputs of gates 175 and 177 are combined in OR gate 178 to provide a signal lead 179 indicating that the compandor circuit at the decoder is to be energized, all as shown in the Brolin patent. The operation of these companding circuits is disclosed in more detail in the aforementioned Brolin patent.

Signals from the decoder's shift register and logic circuits provide inputs to the ringing code detector. The 0 outputs of Y1 stage 170 and Y3 stage 172 are combined with the output of NOR gate 177 in NOR gate 180. Similarly, the 0 outputs of Y2 stage 171 and Y4 stage 173 are combined with the output of NOR gate 177 in NOR gate 181. The outputs of NOR gates 180 and 181 and the subscriber off-hook signal on lead 190 from the current detector 126 volts (FIG. 3) are combined in NOR gate 182 to provide on output lead 183 an enabling signal for PR relay 117 in FIG. 3.

The 1 outputs of Y1 stage 170 and Y3 stage 172 are combined with the output of NOR gate 175 and the subscriber off-hook signal on lead 190 in NOR gate 184. Similarly, the 1 outputs of Y2 stage 171 and Y4 stage 173 are combined with the output of NOR gate 175 and the subscriber off-hook signal on lead 190 in NOR gate 185. The outputs of NOR gates 184 and 185 are combined in OR gate 186 to provide a signal on lead 187 to operate PR relay 115 in FIG. 3.

The outputs of NOR gates 184, 185, 175, and 177, and the subscriber off-hook signal on lead 190, are combined in NOR gate 188 to provide an output signal on lead 189 to operate TR relay 116 in FIG. 3.

It can be seen that the repetitive patterns of the pulse codes shown in Table I are utilized by the logic circuitry of FIG. 5 to provide operating signals on output leads 183, 187, and 189, to carry out all of the party identification functions required by the ringing code detector 114 of FIG. 3. Moreover, so long as the particular code patterns continue to appear on digital line 174, the output signals on lines 183, 187, and 189 will be maintained to sustain their control functions. This obviates the need for any latching circuitry and the consequent need for clearing the latches at the termination of the respective signals.

The logic circuits of FIG. 4 and 5 have been devised to take advantage of integrated circuit technology. One such technology is illustrated in FIG. 6, showing a multiple output converter. The circuit of FIG. 6 comprises a voltage divider including resistors 200 and 201 supplying a signal to the base of transistor amplifier 202. When enabled by an input signal, transistor 202 draws a current through resistors 203 and 204 and diode 205 to enable multiple emitter transistor 206. Multiple emitter transistor 206 can be fabricated in accordance with well-known techniques and provides a plurality of output leads 207, 208, . . . 209. It will be noted that each of these outputs is the logical inversion of the input signal and, moreover, each of these outputs can drive a load which is totally independent of the loads connected to the other output leads. This arrangement permits the implementation of a logical OR function siply by tying together output leads from different multiple emitter transistors. A symbol for the multiple output inverter is shown at 210 in FIG. 6.

In FIG. 7 there is shown one illustrative implementation of the code generator of FIG. 4 using multiple output inverters such as that shown in FIG. 6. Thus, the X1 and P inputs to inverter 250 correspond to the inputs to NOR gate 155 in FIG. 4. Similarly, the inputs to inverters 251, 252, and 253 correspond to the inputs to NOR circuits 157, 158, and 159, respectively, in FIG. 4.

The exclusive NOR function of gate 160 in FIG. 4 is provided in FIG. 7 with inverters 254 and 255, the outputs of which are combined by inverter circuit 256. The outputs of inverters 250, 251, 252, 253, and 256 are combined with the off-hook signal on lead 257 at the input to inverter 258, corresponding to NOR gate 156 in FIG. 4. The off-hook signal on lead 265 is inverted by inverter 259 and combined with digitized voice signals on lead 260 at the input to inverter 261, corresponding to NOR gate 163 of FIG. 4. Finally, the outputs of inverters 258 and 261 are combined with the "spare" code signal on lead 262 at the input of inverter 263 to provide an output on lead 264 to the input of the four-sage shift register.

It will be noted that the code generator implemented in FIG. 7 can be easily integrated with, and may well form a small portion of, the overall voice encoder with which it is associated. The party identification function is therefore accommodated with only a modest increase in the complexity of the channel unit.

In FIG. 8 there is shown a detailed circuit diagram of a multiple output inverter circuit implementing the code detector of FIG. 5. In FIG. 8, inverters 300, 301, 302, 303, 304, and 305 correspond to NOR gates 180, 181, 184, 185, 175, and 177, respectively, of FIG. 5. Similarly, inverters 306 and 307 correspond to NOR gates 182 and 188 in FIG. 5. OR gates 186 and 178 are implemented in FIG. 8 simply by combining the outputs of the appropriate inverters on leads 308 and 309, respectively.

Again, as with FIG. 7, the code detector of FIG. 8 can be implemented in integrated circuit form with a modest increase in the complexity of a voice detector circuit. The output signals from the detector of FIG. 8 can be applied to relay drivers to directly operate the relays 115, 116, and 117 shown in FIG. 3. In this way, a selective ringing signal can be applied to the remote party line with the contact arrangement shown in FIG. 3.

What is claimed is:

1. A digital selective calling circuit for party line telephone systems comprising:
    means connected to termination of said party line for generating repetitive selective party identification cyclic serial pulse coded groups of signals,
    detector means connected to the other termination of said party line responsive to each said serial pulse coded signal group to produce a unique response signal regardless of the phase sequence of the pulse positions within said group; and
    selective ringing circuits responsive to said response signals to generate selective telephone calling signals.

2. The digital selective calling circuit according to claim 1 wherein:
    said generating means and said detector means comprise a plurality of logical NOR circuits.

3. The digital selective calling circuit according to claim 1 wherein:
    said generating means and said detector means comprise a plurality of multiple output inverters.

4. The digital selective calling circuit according to claim 3 wherein:
    said multiple output inverters comprise multiple emitter transistors.

5. A digital telephone loop transmission system comprising:
    a source of voice frequency signals,
    a source of supervisory signals including selective calling signals,
    an encoder for said voice frequency signals including a cyclic code generator responsive to said calling signals for generating cyclically encoded calling codes,
    a decoder responsive to encoded voice frequency signals and including a cyclic code detector, and
    a ringing generator responsive to said cyclic code detector to selectively ring any one of a plurality of subscriber telephone sets on said telephone loop.

6. The digital telephone loop transmission system according to claim 5 wherein said cyclic code generator comprises a plurality of non-latching logic gates.

7. The digital telephone loop transmission system according to claim 5 wherein said cyclic code detector comprises a plurality of non-latching logic gates.

8. A digital/analog interface at the remote terminal of a multiparty telephone line comprising:
    a digital/analog converter for voice frequency signals,
    a cyclic code converter for converting cyclic code groups from the central office terminal into telephone supervisory signals, and
    means for alternatively transmitting the outputs of said two converters on said telephone line.

9. The digital/analog interface according to claim 8 wherein said cyclic code converter comprises a plurality of logic gates.

10. The digital/analog interface according to claim 8 wherein said cyclic code converter comprises a plurality of multiple output inverters.

11. An analog/digital interface at the central office terminal of a multiparty telephone line comprising:
- an analog/digital converter for voice frequency signals,
- a cyclic code converter for converting telephone supervisory signals into cyclic code groups for transmission to the remote terminal of said multiparty telephone line, and
- means for alternatively transmitting the outputs of said two converters on said telephone line.

12. The analog/digital interface according to claim 11 wherein said cyclic code converter comprises a plurality of logic gates.

13. The analog/digial interface according to claim 11 wherein said cyclic code converter comprises a plurality of multiple output inverters.

* * * * *